Patented May 15, 1934

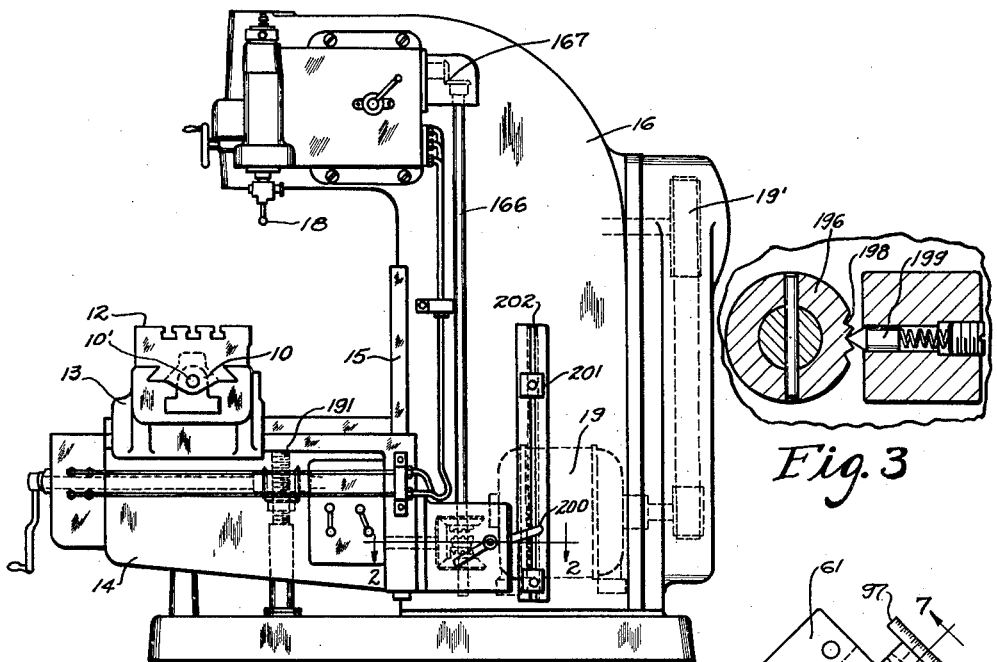
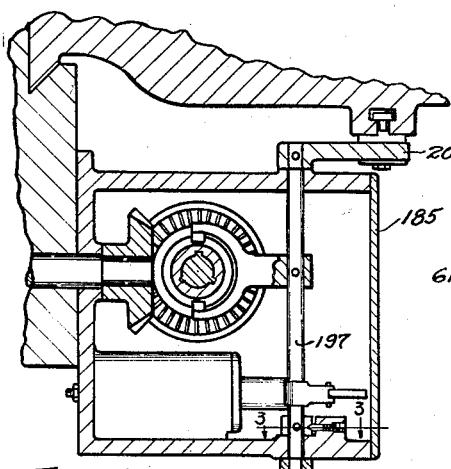
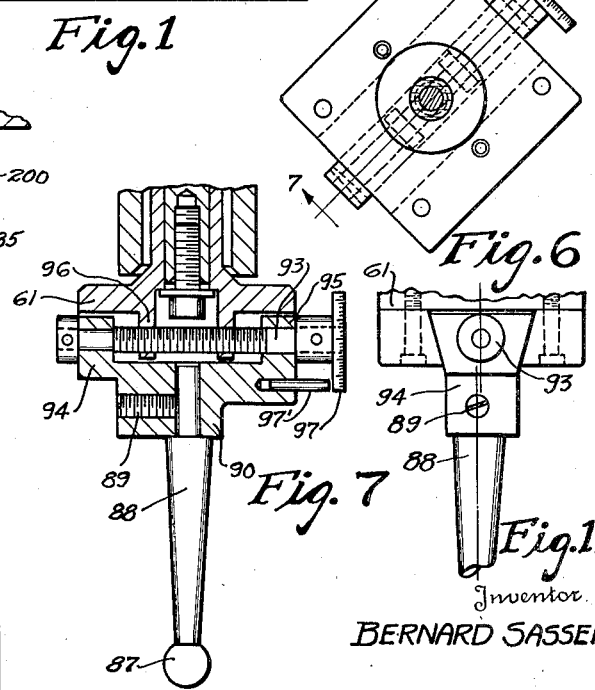
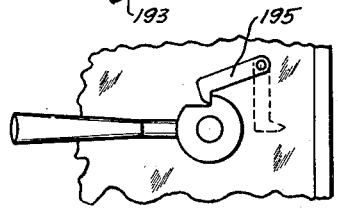

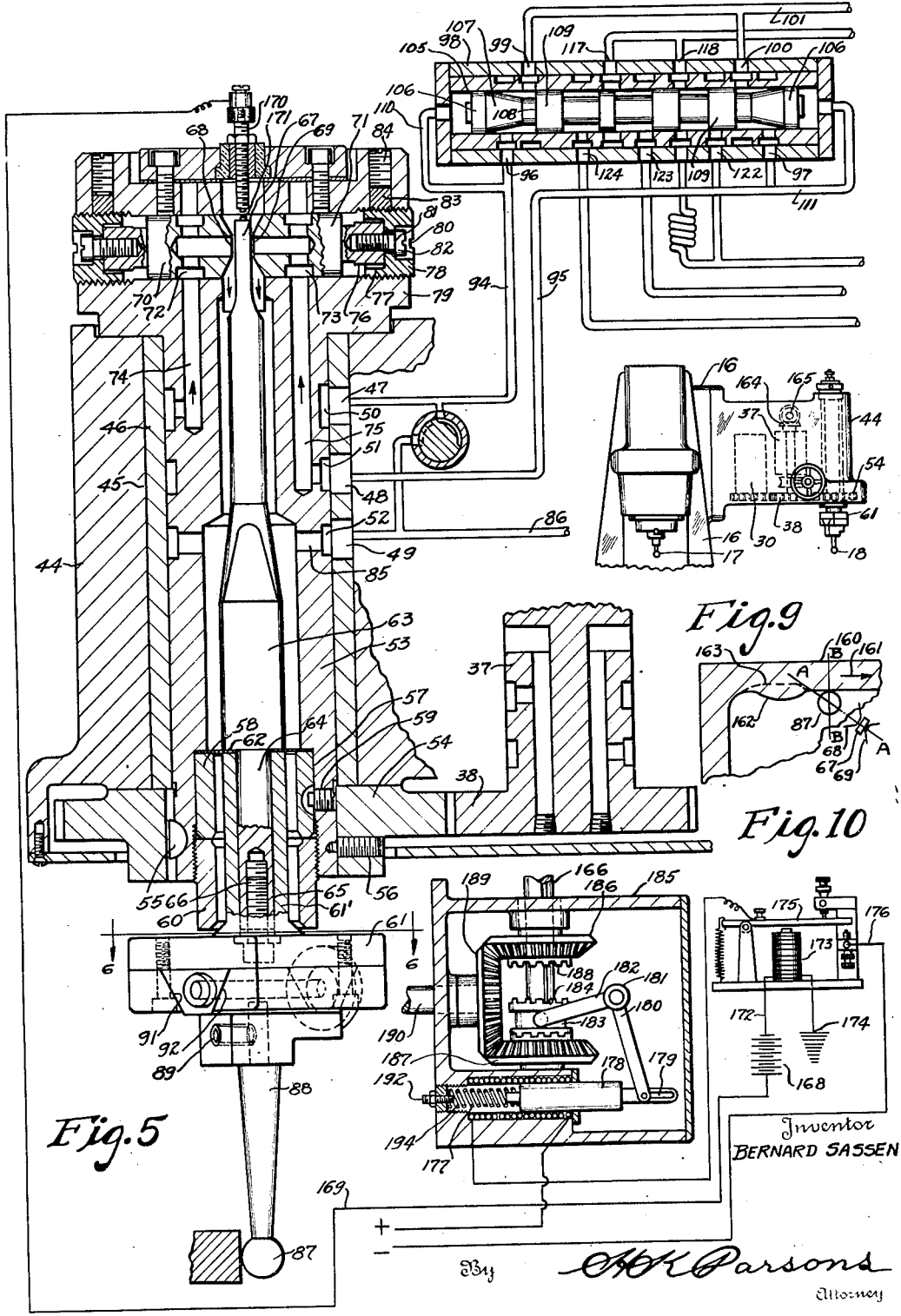

1,959,178

UNITED STATES PATENT OFFICE 1,959,178

TRACER CONTROL MECHANISM

Bernard Sassen, Cincinnati, Ohio, assignor to The Cincinnati Milling Machine Company, Cincinnati, Ohio, a corporation of Ohio Application July 10, 1933, Serial No. 679,653

19 Claims. (Cl. 90—13.5)

This invention relates to automatic pattern controlled profiling and die-sinking machines and more particularly to improvements in tracer control mechanism therefor.

In hydraulically actuated machines of the character described, the tracer mechanism is utilized to control the flow of fluid pressure to the slide motors in such a manner as to cause relative movement between the cutter and work along a prescribed path corresponding to the contour of a master. In some machines the tracer is mounted in a rotatable tracer head so that tracer buttons of different diameter than the cutter may be utilized and on this account a predetermined angular relation between the tracer and pattern must be established and maintained throughout the cutting operation. A machine of this nature is shown in the co-pending application of Sassen and Ernst, Serial Number 634,014, filed September 20, 1932.

One of the objects of this invention is to improve the sensitivity of automatic pattern-controlled machines of the class described and thereby increase the accuracy of duplication or reproduction thereof.

Another object of this invention is to simplify tracer mechanisms whereby the tracer arm constitutes the sole movable part for controlling the hydraulic circuit.

A further object of this invention is to provide an improved and simplified tracer mechanism for die-sinking purposes which not only controls the hydraulic circuit which determines angular movement in a given plane, but is also responsive to terminate feed movement in a direction at right angles to said plane as for instance when the bottom of a die has been reached.

An additional object of this invention is to provide a simplified pilot valve for an hydraulic amplification system whereby minute tracer movements may be translated into relatively large movements of a main control valve.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 1 is a side elevation of a machine embodying the principles of this invention.

Figure 2 is a section on the line 2—2 of Figure 1.

Figure 3 is a section on the line 3—3 of Figure 2.

Figure 4 is a detail view of the latch lever.

Figure 5 is a section through the tracer head adjusting mechanism.

Figure 6 is a section on the line 6—6 of Figure 5.

Figure 7 is a section on the line 7—7 of Figure 6.

Figure 9 is a detail front view of the cutter and tracer support.

Figure 10 is a diagrammatic view showing the relationship of the parts of the tracer mechanism during contact of the button with the pattern.

Figure 11 is a detail view showing the offset relation of the tracer arm with respect to the axis of the tracer head.

Figure 8:
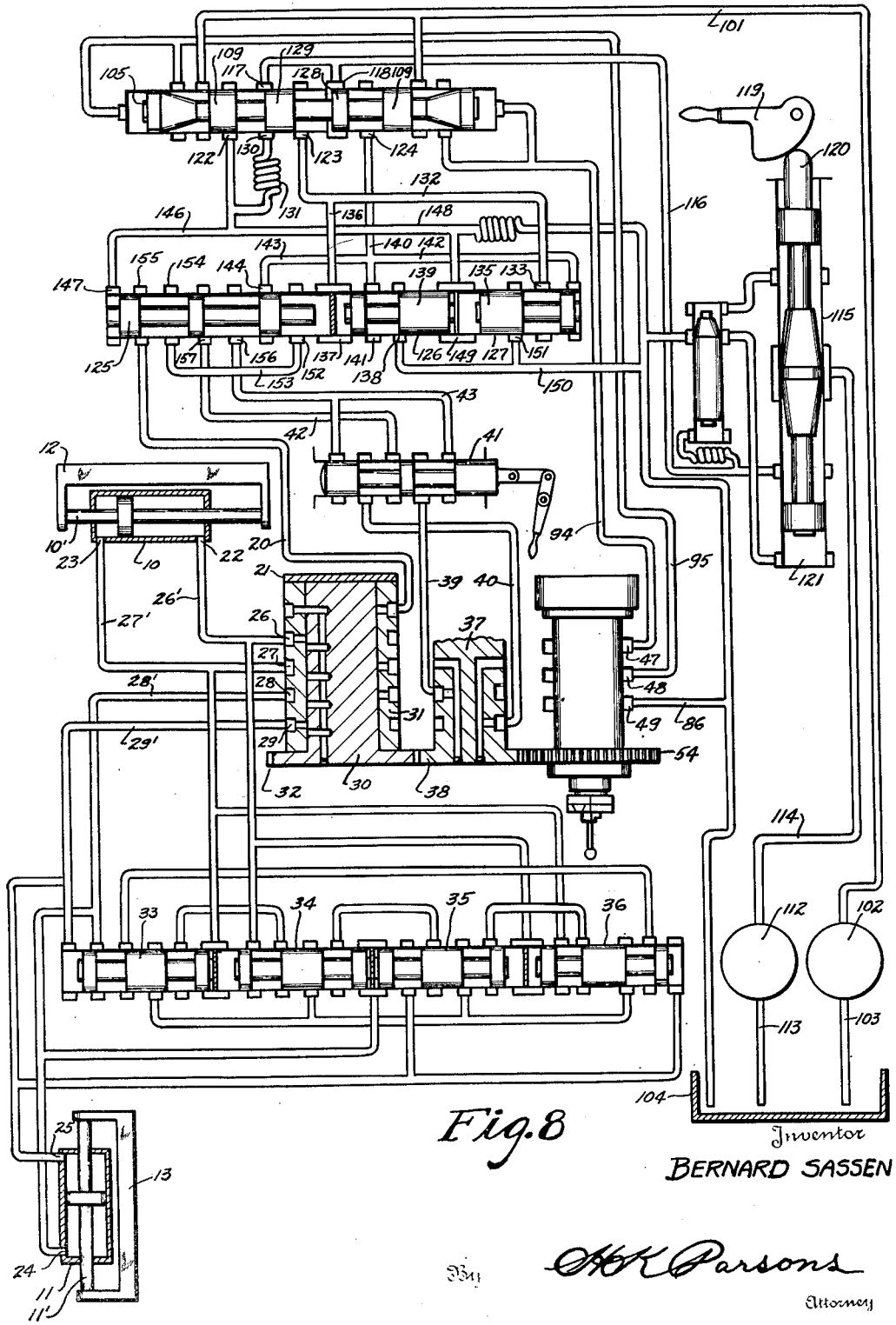
Figure 8 is a diagram of the hydraulic control circuit.

One form of machine to which this invention may be applied is illustrated in Figure 1 and it has a pair of hydraulic motors 10 and 11, as more particularly shown in Figure 7, for effecting relative movement between the cutter and work in accordance with relative movement between a pattern and tracer. In the present instance the motor 10 is connected as by piston rod 10' to the table 12; and the motor 11 connected as by piston rod 11' to the saddle 13 in which case it will be apparent that the pattern and work may be carried by the table for movement in two directions relative to a tracer and cutter. The saddle 13 is reciprocably mounted on a knee 14 which is supported on vertical guideways 15 formed on a column 16. The cutter 17, Figure 9, and the tracer button 18 are supported by a fixed part of the column which overhangs the work support organization. The cutter may be rotated through a suitable transmission 19' driven from a prime mover 19 located in the interior of the column which is also used to drive the pumps which supply fluid pressure for the motors.

Fluid pressure is delivered to the motors 10 and 11 by a supply line 20 connected to a directional control valve 21, which valve functions to distribute the flow to the four motor ports 22, 23, 24 and 25 in such manner as to determine the direction of resultant movement of the pattern and work. To this end the directional control valve has four ports 26, 27, 28 and 29 which are connected by channels 26', 27', 28' and 29' to ports 22, 23, 24 and 25 respectively. The division of flow is effected by the rotatable valve member 30 which is journaled in the valve body 31 and provided with a gear 32 on one end for power rotation. The valve member 30 has a series of ports which are so formed about the periphery thereof that during one revolution of the valve the direction of resultant movement between the work and cutter will change through successive angles up to 360 degrees. Considering the two motors as mounted at right angles to one another so that one extends in a north and south direction and the other in an east and west direction, it will be apparent that to effect movement in any one of these four directions only one of the four motor ports will be connected to pressure while the respective opposing motor port will be connected to exhaust, the other motor being hydraulically locked against movement. When movement is to occur at any intermediate angle, it is apparent that two of the motor ports must be connected to pressure and also in a manner that the quantity of flow to one will be in such proportion to the quantity of flow to the other that the desired resultant angle will be obtained. In other words, the flow must be so proportioned quantitatively as to impart proportional velocities to the two slides in order to obtain angular direction. When, however, two motors are thus connected simultaneously to a common source of pressure, their movements will be irregular if the work resistances of each are uneven, and, therefore, in order to maintain the given proportionate flows established by the distributor valve a series of balancing valves 33, 34, 35 and 36 are provided and connected to the respective lines so that the flow will be balanced between any two lines of the four combinations. For a more complete description of the manner and operation of the distributor valve and associated balancing valves, reference may be had to the co-pending application supra and therefore further description thereof is not believed to be necessary.

The directional control valve drive gear 32 is operatively connected to a motor 37 having a gear 38 meshing with gear 32. This motor is preferably of the hydraulic type and is connected by a pair of channels 39 and 40 to a reversing valve 41, this valve serving to change the direction of rotation of the motor as determined by a preceding flow dividing valve and thereby the direction of movement of the directional control valve. Two conduits 42 and 43 extend to the reversing valve, which may be alternately under pressure to cause rotation in accordance with the master. The method of operation of the machine is such that the motor supply conduits and the directional valve supply conduit 20 are connected to a common flow dividing valve in such a manner that when a maximum flow is delivered to line 20, there is no flow to the motor, and vice versa, which means that at any time the direction of relative movement between cutter and work is changed, the rate of said relative movement will be decelerated due to partial diversion of the fluid to the motor. In other words the quantities of fluid supply to the directional control valve and its actuating motor are complementary to one another so that upon decrease of one, the other will be increased.

The subject of this invention constitutes an improved tracer mechanism and pilot control circuit for determining the proportion of flow through channel 20 and the motor supply channels. As shown in Figure 5 a tracer supporting housing 44 is provided with a bore 45 in which is fixed a bushing 46. This bushing has three ports 47, 48 and 49 formed therein which cooperate respectively with three annular grooves 50, 51 and 52 formed in the periphery of the tracer head 53 which is journaled for rotation in the bushing. A gear 54 is secured as by a key 55 and set screw 56 to the lower end of the tracer head and in operative mesh with the gear 38 of the hydraulic motor 37. The lower end of the head 53 is counterbored at 57 for receiving a tracer arm support comprising a first sleeve 58 which is inserted in the counterbore and held against rotation by a set screw 59, and a second coaxial sleeve 60 which is threaded into the lower end of the bore for clamping the first sleeve in position without turning it.

The purpose of this will now be explained. A tracer support 61 has a reduced shank portion 61' in an axial bore 65 of which, is fitted the reduced end 64 of a valve arm 63. Between the shoulder of the valve arm formed by the reduced shank 64 and the end of the shank 65, is secured a thin flexible metallic diaphragm 62, the parts being held together by a screw 66. This assembly is inserted in the counterbore, the diaphragm having a diameter slightly less than the diameter of the counterbore to permit this. The sleeve 58 is then inserted in the counterbore and the screw 59 inserted, to prevent turning of the sleeve. The second sleeve is then secured in the counterbore to firmly clamp the parts. Since the upper end of the valve arm 63 must be angularly positioned first in a predetermined relation to valve parts to be later described, the screw 59 prevents this setting of the arm from being disturbed during tightening of the second sleeve 60.

The upper end of the arm 63 is flattened, as at 67, to form a flapper valve between two ports or jets 68 and 69. These ports are formed in adjustable plungers 70 and 71, the axes of which lie in the plane of movement of the member 63, and each is provided with an annular groove 72 and 73 respectively which are connected to channels 74 and 75 extending longitudinally in the rotatable member 53.

The adjusting mechanism for each plunger is the same and therefore only one will be described. The member 71 is provided with a reduced portion 76 which extends into a counterbore 77 in the locking member 78. The locking member is threaded into the enlarged portion 79 of the member 53 and provided with a diametric groove 80 for the application of a suitable tool for effecting rotation thereof. A screw 81 passes axially through the locking member into threaded engagement with the end of the plunger shank 76, and has a head 82 by which the plunger 71 is secured to the locking member 78. The locking member is held in position by a clamping member 83 forced into engagement therewith by the set screw 84. The ends of the plungers 70 and 71 are frusto-conical in shape in order to provide a small annular land about the rim of the respective ports, which has been found from experiment to give the best condition for obtaining quick changes in the pressure gradient at the two ports and also better balance of the parts.

The axially extending channel 74 in member 53 is connected to the annular groove 50, while the axially extending channel 75 is connected to annular groove 51. Both of these grooves are under constant pressure so that there is a continuous flow through ports 68 and 69, the fluid escaping to the space between the arm 63 and member 53. This space is sealed at the bottom by diaphragm 62 and therefore radial openings 85 are provided, communicating with the annular groove 52 and port 49, which port is connected to the return line 85 to permit unrestricted escape of fluid. It will now be seen that if the valve arm 63 is moved back and forth in the plane of the drawings that the ports 69 will be complementarily opened and closed thereby lowering the hydraulic resistance to flow from one port and increasing the hydraulic resistance to flow from the other, thus establishing a pressure differential between the two incoming jets of fluid. This pressure differential is utilized through an hydraulic amplification system to control the position of a main valve which determines the division of flow between the supply channel 20 and the motor supply channels 42, 43 and thereby the direction of resultant movement between the cutter and work in accordance with a master.

The tracer button 87 is secured to the end of the tracer arm 88 by means of a set screw 89, as more particularly shown in Figure 7, the arm depending from a radially adjustable support 90. This support has a dove-tailed guide 91 which is reciprocably mounted in a correspondingly shaped dove-tailed guideway 92 formed in the tracer support 61. Attention is invited to the fact that the longitudinal axis of this guideway extends in a direction or lies in a plane which is at an angle of substantially 45 degrees to the axes of the jets; and that the axis of the arm 88 is offset as shown in Figure 11 relative to the axis of the head.

The slide 90 is longitudinally adjusted in its guideway by the screw 93 which is journaled at opposite ends in upwardly extending lugs 94 and 95 integral with the slide. The member 61 has a pair of downwardly extending lugs 96 which are threaded to receive the screw 93. The end of the adjusting screw is provided with a graduated knob 97 cooperating with a fixed mark on pin 97' whereby the slide may be micrometrically adjusted to offset the vertical axis of the arm 88 relative to the axis of rotation of the tracer head 53.

The object of the offset is to permit the tracer to extend slightly in advance of the cutter along the path of movement and act as a feeler to detect any abrupt changes in the contour of the pattern, such as when advancing into the corner of a die and of course it will be obvious that all this is predicated on the fact that the direction of relative feed will be at right angles to the axis of adjustment of the button. The purpose of the adjustment is to regulate the radial distance from the center of the tracer head to the point of contact between tracer button and pattern so that it will be equal to the radius of the cutter since this invention contemplates the use of tracer buttons of a diameter different from the cutter.

The manner in which the valve 67 controls the movement of the tracer and cutter relative to a pattern and a work piece will now be explained. The previously mentioned ports 47 and 48 are connected by pressural control channels 94 and 95 respectively to ports 96 and 97 formed in the flow dividing valve 98. A second pair of ports 99 and 100 are connected in parallel to the incoming pressure channel 101 supplied by a constant delivery pump 102. This pump has an intake 103 extending into a reservoir 104 from which fluid, such as oil, is drawn and continuously delivered to the ports 99 and 100.

A reciprocable valve plunger 105 is mounted in the casing 98, and this plunger has a spool portion 106 formed on each end thereof which is in the form of a piston and serves to effect power movement of the plunger. Next to these piston portions are reduced tapered portions 107 which serve as a means for complementarily and gradually opening and closing the ports 96 and 97. These tapered portions extend in opposite directions so that upon plunger movement to the right, as viewed in Figure 5, the port 96 will be gradually closed and the port 97 will be gradually opened. This movement also results in the pressure drop across the port 96 increasing over the pressure drop at the port 97. Upon movement of the plunger to the left the opposite effect will follow, that is, the port 96 will gradually open thereby decreasing the pressure drop occurring at that port; and closing the port 97 causing an increase in the pressure drop occurring at that port. The tapered portions 107 finally terminate in a shoulder 108 formed by the spool portions 109. These portions are so spaced that when the valve plunger is centrally located in its bore, the ports 99 and 100 will be wide open, but the tapered portions 107 will partially throttle both ports 96 and 97 causing an equal pressure drop to occur at each port. By having a predetermined drop in pressure occurring at each port when the plunger is in a central position, it makes it possible to increase or decrease one relative to the other upon axial movement of the plunger which would be impossible if no provision was made for a drop in pressure when the valve is in a central position.

A branch 110 from line 94 is connected to the left hand end of the valve housing 98, and a similar branch 111 connects the conduit 95 to the right hand end of the valve casing whereby the pressure existing in lines 94 and 95 will be communicated respectively to the opposite ends of the plunger. It should now be apparent that when the plunger 105 is in a central position, an equal pressure drop will occur between the main supply line 101, and channels 94, 95 which will result in the pressure in these two lines being equal and therefore the pressure on opposite ends of the plunger 105 will be equal and no movement of the plunger will take place. If for any reason the plunger 105 should be moved out of its central position as for instance toward the left the drop in pressure between port 99 and 96 would decrease causing a rise in pressure in the line 94 and simultaneously an increase in pressure drop between ports 100 and 97 thereby decreasing the pressure in line 95. A pressure differential would thus be created in these two lines which would be communicated to opposite ends of the plunger and due to the fact that the pressure on the left hand end would be higher than the pressure on the right hand end, the plunger would shift accordingly until the pressures in these two channels again became equal, and since equal pressure would then be acting on both ends of the plunger, it would be substantially hydraulically locked in that position.

Attention is further invited to the fact that the amount of movement of the valve 67 is comparatively small, namely, of the order of a few thousandths and it is of course desirable that it be as small as practicable because the sooner that any slight deflection of the tracer arm 88 is detected and the proper correction transmitted to the cutter, the more accurate the work will be produced in accordance with the pattern. In the present instance, the drop in pressure occurring at ports 68 and 69 is perhaps equivalent to 500 pounds at each port when the valve 67 is in a central position, so that upon movement of the valve in either direction, a large pressure differential may be created with only a few thousandths of an inch movement. If the shape of the cones 107 of plunger 105 are such that longitudinal movement of the valve for a sixteenth of an inch produces only a change of fifteen or twenty pounds in the pressure drop, it will be apparent that the few thousandths of an inch movement of the valve 67 may be amplified into a large movement of the valve plunger 105. A considerable movement in the plunger 105 is desirable in order to properly open and close the valves which divide the flow between the flow dividing valve and the motor. The valve 67 and ports 68 and 69 thus constitute a pilot valve for an hydraulic amplification system whereby slight movements of the valve member 67 causes a pressure differential to be set up in channels 94 and 95 which pressure differential causes the valve member 105 to shift, which shifting movement will continue until the member itself automatically causes by its own movement a re-equalization of pressure in channels 94 and 95.

The fluid pressure for actuation of motor 37 and for supplying distributor valve 30 is produced by a second constant delivery pump 112 having an intake 113 extending into the reservoir 104 and a delivery channel 114 which is connected to the rate determining valve 115. A channel 116 extends from the rate control valve to the pressure ports 117 and 118 formed in the valve housing 98. The rate control valve is similar to that described in the copending application supra and further description thereof is not believed to be necessary, except to state that the control handle 119 acts on the end of the valve plunger 120, the plunger being held against the control lever by the hydraulic pressure acting at the end 121 so that upon movement of the lever 119 in an upward direction the volumetric flow to channel 116 will increase while downward movement of the plunger will decrease the flow and cause a slowing down in the rate of operation of the machine.

The flow dividing valve 98 has three additional ports 122, 123 and 124 formed therein which are connected by channel means to an engagement control valve 125, and a pair of balancing valves 126 and 127. The plunger 105 has an additional spool 128 which is the same width as the port 118 so that when the plunger covers the port there will be no fluid flow to ports 123 and 124. The plunger also has another spool 129 which serves to partially close the pressure port 117 when the valve is in a central or neutral position, so that only a partial flow will occur through the port 130 and the hydraulic resistance coil 131. The port 122 at this time is closed by the spool 109.

The port 123 is connected by channel 132 to the port 133 of the balancing valve 127 having the reciprocable plunger 135 mounted therein. A branch 136 connects conduit 132 to the port 137 which is sufficiently wide to communicate with one end of the balancing valve 126 having reciprocable plunger 139 therein, and one end of the tracer engagement control valve 125. Since there is a slight flow in the channel 132 and its branch 136, the engagement control valve 125 will be moved to the left, and the balancing valve plunger 139 will be moved to the right, all as shown in Figure 8. The port 124 is connected by channel 140 to port 141 of the balancing valve 126; by a branch 142 to the right hand end of balancing valve 127, and by a third branch 143 to port 144 formed in the engagement control valve 125. The port 122 is connected by channel 146 to the port 147 formed in the left hand end of the engagement control valve, and by a branch 148 to the port 149 which is sufficiently wide to communicate with the left hand end of the balancing valve 127 and the right hand end of the balancing valve 126.

Attention is invited to the fact that the port 68 in the tracer head is slightly larger in diameter than the diameter of the port 69 so that when the tracer 87 is free of the pattern, the valve 67 will be moved slightly toward the right as viewed in Figure 5 and therefore the actual drop in pressure at the port 68 will be slightly less than the drop in pressure at the port 69. This will cause the pressure in channel 95 to be less than the pressure in channel 94 and the valve plunger 105 will accordingly take up a position a little to the left of the central position so as to cause a small flow from port 118 to the port 123 and simultaneously prevent any flow to the ports 122 and 124, as more particularly shown in Figure 8 in which the valve 105 is reversed end for end from its position shown in Figure 5. There will, also be a slight flow through the port 130 which will exert a slight pressure on the end of the balancing valve 135 and shift the same to the right because at this time the channel 142 is connected through ports 141 and 138 to the return channel 150. The shifting of the balancing valve 135 to the right will disconnect port 151 which is also connected to the return line 150. This will cause a pressure flow to occur in the branch line 136 and port 137 which will continue through port 152, channel 153 and port 154, and since the latter port is at this time connected to port 155, the flow will continue through the conduit 20 to the distributor valve 30. The motors 10 and 11 will thus be actuated at their maximum rate and effect relative movement between the work and pattern and the cutter and tracer to cause the one to approach the other. This movement will continue until the tracer contacts the pattern at which time it will be deflected. This deflection will cause a movement of the valve 67 in a direction toward the port 68 effecting an increase in the pressure drop at this port and simultaneously a decrease in the pressure drop at 69 so that the pressure in line 94 will now be instantaneously higher than the pressure in line 95 causing the plunger 105 to shift toward the right. This shifting movement will stop the flow to port 123 and start the flow to port 124. Movement of the valve plunger 105 toward the left as viewed in Figure 8, will immediately connect the port 117 to port 122 which will put the port 147 of the engagement valve under pressure and cause shifting of the valve plunger 125 toward the right. This will immediately disconnect the port 154 from the port 155 and connect the port 155 with port 147 so that the flow to the distributor valve will now take place through channel 146 rather than through the branch line 136. Simultaneously with the movement of valve 105, the port 118 will be connected to port 124 and an hydraulic flow will occur in channel 140 but due to pressure in the branch 148, the balancing valve plunger 139 will be shifted to the left so as to disconnect the port 141 from the return line 150. Pressure in the branch line 142 will also shift the valve plunger 135 to the left and connect port 133 to port 151 of the return line so that the channel 132 will now drain to reservoir. This will relieve the pressure in branch line 136 and the port 137, so that the valve plunger 139 and plunger 125 are substantially free to move toward one another. When the plunger 125 moves toward the right. it also connects port 144 to port 156 which is connected to the motor channel 43 to cause rotation of the motor in one direction. The motor channel 42 which terminates at port 157 is now connected to port 154 so that the return flow from the motor will escape through channel 153, port 152, port 137, branch 136, channel 132, port 133, port 151 to the return line 150. The flow between the distributor valve channel 20 and the motor channel 43 is balanced by valve 135 which is acted upon at one end by the pressure in line 148 corresponding to the pressure in the distributor valve supply line 20, and on the opposite end by the pressure in line 142 corresponding to the pressure in the motor supply line 43. As the valve 135 oscillates back and forth it controls the return flow from the motor which thus acts back through the channel 43 to maintain the proportion of flow established by valve 105.

The spool 128 thus controls the flow to ports 123 and 124 to determine the direction of movement of motor 37 and when in a central position stops flow to the motor. In this latter case the ports 117 and 122 are both open half way permitting maximum flow to the distributor valve. It will thus be apparent that when the spool 128 shifts to either side of its central position with respect to port 118 that either port 117 or 122 will be gradually closed thereby decreasing the flow to the distributor valve.

It will thus be seen that a tracer controlled pilot valve has been provided which is adapted to control, through the means of an hydraulic amplification circuit, the position of a flow dividing valve and that the latter in turn determines the position of a distributor valve and also maintains the eccentric arm of the tracer button in predetermined angular relation to a tangent at the point of contact between the tracer button and the pattern.

It will be recalled that it is general practice in the operation of automatic pattern controlled machines of the character described to adjust the center of the tracer button eccentrically to the axis of the tracer head so that the line connecting these two axes constitutes in effect a radial arm which sweeps about the center of the tracer head. It is also obvious from the description of the flapper valve that it is only effective in one plane of movement and that pressure on the tracer button at right angles to that plane would not produce any change in pressure drop at the jets. It is therefore necessary, as previously mentioned, to establish a predetermined relation between the plane of movement of the flapper valve, and the plane of movement of the tracer button when in contact with the pattern. Since perhaps the worst condition that can be met in practice is a 90 degree or slightly greater dihedral angle, it will be apparent that the contact pressure on the tracer button can only change through an angle of 90 degrees and therefore if the plane of operation of the flapper valve was in a position to bisect this angle, the sudden shifting of contact pressure through this angle would still make it possible for the valve to respond to such pressure. The distributor valve is interconnected for rotation with the tracer head in such angular relation that for a given angular position of the tracer head and thereby the plane of operation of the flapper valve, that the direction of feed as determined by the distributor valve will be at an angle of 45 degrees to said plane.

The result of this is diagrammatically illustrated in Figure 10 showing the tracer button 87 in contact with a pattern or master 160 and in which the line AA represents the plane of operation of the flapper valve and the line BB the direction of adjustment of the button. If this plane is at 45 degrees to the surface of the pattern, it will be apparent that the direction of movement of the pattern and thereby of the arm will be in a direction indicated by the arrow 161. If now the tracer button engages a bulge or projection 162 on the pattern surface, it will be seen that the valve 67 will move toward the port 68 and cause rotation of the tracer head and the distributor valve in such directions as to reestablish the predetermined angular relation of 45 degrees. If the tracer botton should engage a depression such as 163 in the pattern surface, it would move in such direction as to cause the valve 67 to move toward the port 69 and cause a reverse rotation of the parts to reestablish said predetermined angular relationship. It will thus be seen that by maintaining this relationship that the tracer will be responsive to all variations in the pattern and that the valve 67 will operate for all conditions that might be met in practice.

The shaft of the hydraulic motor 37 is connected through bevel gearing 164 as shown in Figure 9, to a horizontal shaft 165 which in turn is connected to a vertical shaft 166 as shown in Figure 1, through a similar bevel gearing 167. This drive is utilized to effect a relative feeding movement between the cutter and work in a direction perpendicular to the plane of movement of the slides 12 and 13, or in other words, in a direction parallel to the axis of the cutter. During die-sinking operations this drive is continuously connected to the knee 14 to effect a gradual movement thereof during travel of the tracer and cutter around the contour of the die rather than by an intermittent feed movement after the completion of one turn around the periphery of the die. In other words, the die-sinking operation is carried out by a sort of spiralling movement into the die. For this reason, it has been necessary in prior structures for the operator to observe carefully when the bottom of the die has been reached by the tracer to prevent possible over-run, and more particularly to prevent damage to the tracer button and connected mechanism due to excessive end pressure thereon. In the present construction the tracer button has been supported on the aforementioned diaphragm in order to permit slight axial movement of the tracer button support for controlling the depth of the die-sinking operation. To this end an electrical control circuit has been provided which, as shown in Figure 5, comprises a battery 168 which is connected by one line 169 to a contact pin 170 threaded in the top of the tracer head but insulated therefrom. This pin is adapted to be engaged by the contact point 171 carried at the end of the arm 63 and upon a predetermined amount of axial movement thereof whereby the circuit will be grounded through the machine. A second line 172 connects the battery to a relay armature 173 which is permanently grounded at 174. This relay has an armature 175 which is adapted to close the circuit 176 to an electrically operated solenoid 177. A plunger 178 is reciprocably mounted in the solenoid and has a lost motion connection at 179 to a lever arm 180 of a bell crank 181. The other arm 182 of this bell crank constitutes a shifter fork engaging an annular groove 183 in the reversible clutch member 184.

The drive shaft 166 extends into a box 185 and has keyed thereto a pair of bevel gears 186 and 187 which have clutch teeth 188 formed on opposing faces thereof for engaging similar-formed clutch teeth on opposite sides of the clutch member 184. The bevel gears 186 and 187 mesh with the bevel gear 189 secured to the end of shaft 190 which is inter-connected through a suitable and well-known gear train with the elevating screw 191. An adjustable stop member 192 is threaded in the end of the solenoid for limiting the inward movement of plunger 178 and insuring that the clutch 183 is moved to a central or neutral position. It will be obvious that when the plunger 178 is actuated electrically that the lost motion at 179 will be taken up first before the clutch is moved. This lost motion permits the bell crank 181 to be rotated by the manually operable lever 193 shown in Figures 2 and 4 as mounted on the exterior of box 185. Since a spring 194 is inserted in the solenoid for effecting return movement of plunger 178 upon deenergization of the solenoid a latch lever, as shown in Figure 4, is provided for holding the clutch in an engaged position with the clutch teeth on bevel gear 186 whenever this position of the clutch is desired and at a time when the solenoid is deenergized. To further assist in maintaining the various position of the clutches, a detent mechanism such as shown in Figure 3, is provided comprising the detent member 196 which is pinned to the shaft 197 and has a plurality of notches 198 engageable by the spring pressed pin 199. An additional lever 200 is secured to the end of shaft 197 for engagement by suitable dogs 201 mounted in a T-slot 202 carried by the side of the column whenever it is impossible to use the electrical control circuit.

There has thus been provided an improved tracer controlled mechanism for hydraulically operated profiling or die-sinking machines which may be utilized for not only controlling the various directions of movement in a single plane but also for limiting or determining a feed movement in a third plane at right angles to the profiling plane.

What is claimed is:

1. In a tracer control mechanism for an hydraulically operated profiling machine having a directional control valve for determining the direction of relative feed movement between a cutter and work piece, and hydraulically operable means for changing the position of the directional control valve including a flow dividing valve, the combination of a rotatable tracer head, a tracer button carried by the head and offset along a radius to the axis of the head, means to adjust the button along a path perpendicular to said radius, and a control valve for said hydraulically operated means carried by the head and movable in a plane substantially bisecting the angle between said radius and path in response to movement by the tracer button to control the position of the directional control valve and thereby maintain the direction of feed normal to the path of adjustment of the button.

2. In a tracer control mechanism for an hydraulically operated profiling machine having a directional control valve for determining the direction of relative feed movement between cutter and work, and hydraulically operable control means for varying the position of the directional control valve, the combination of a rotatable tracer head, a tracer arm mounted for universal movement in said head, a tracer button carried by the arm but eccentric to the axis of said head, control valve means positioned in the head and responsive to a single component of arm movement, and means coupling the control valve to said hydraulically operated control means for maintaining the direction of feed at a predetermined angle to the axis of said component movement.

3. A tracer control mechanism for an hydraulically operated profiling machine in which a plurality of hydraulic motors are utilized to effect a relative feed movement between a cutter and work and between the pattern and tracer, and a rotatable directional control valve determines the proportionate flow to said motors, comprising a tracer head, an arm pivotally mounted in said head, a tracer button mounted on the arm with its axis eccentric to the axis of the head, means to adjust the button relative to the arm along a path perpendicular to a radius connecting said axes, a control valve carried by the head, means operable by the control valve for determining rotation of the directional control valve, and means coupling the last named valve to the tracer for joint movement whereby the direction of feed determined by the directional control valve for a given angular position of the head will be at right angles to the direction of the path of adjustment of the tracer button.

4. A tracer control mechanism for an hydraulically operated profiling machine in which a plurality of motors are utilized to effect relative feed movement between the cutter and work, and likewise between the pattern and tracer, a directional control valve determines quantitatively the fluid delivery to the respective motors, hydraulically operable means determining the position of the directional control valve and a flow dividing valve which complementally varies the flow between the control valve and the hydraulically operable means; comprising a rotatable tracer head coupled for rotation with said directional valve, a tracer button carried by the head eccentric to the axis thereof, an operating arm mounted in the head for movement in response to movement of the tracer button and hydraulic amplifying means coupling the arm to the flow dividing valve whereby small movements of the tracer button will effect proportionately large movements of the flow dividing valve.

5. A tracer control mechanism for an hydraulically operated profiling machine in which the position of an adjustable valve determines the direction of relative feed movement between the cutter and work and fluid operable means are utilized for power positioning said valve, said means including a pair of pressural control channels, comprising in combination a tracer head, an arm pivotally mounted therein, said arm having a tracer portion at one end for contacting a pattern, and means adjacent the other end of said arm for varying the pressure in said channels including coaxial jets at opposite sides of the arm, so that movement of the arm will complementally vary the pressure gradient of said jets, and momentarily create a higher pressure in one channel over the other for operating purposes.

6. In an hydraulically operated profiling machine having a first valve for determining the direction of relative feed movement between the cutter and work, and means for changing the position of said valve, including a fluid operable control valve, a source of pressure, a pair of pressural control channels, means in the valve for separately connecting each channel with the source of pressure, said means being movable with the valve to complementally vary the pressure gradient to each channel, the combination of a tracer controlled mechanism for controlling the escape of fluid from said channels including a tracer head, an oscillatable control arm carried by the head and having means at one end for contacting a pattern, a pair of coaxial jets spaced at opposite sides of the other end of said arm, said jets forming the termination of said channels, and means in the arm and movable in accordance with the pattern to complementally vary the pressure gradient of said jets inversely to the preceding pressure gradients in the respective channels, and means connected to said channels intermediate the hydraulic resistances for shifting said valve upon creation of a pressure differential between said channels.

7. In an hydraulic profiling machine having a flow dividing valve for changing the direction of relative movement between a cutter and work, and an hydraulic amplification system including a pair of pressural control channels for determining the position of said valve, the combination of a tracer mechanism having a pivoted arm, means on one end of the arm for engaging a pattern, said channels terminating in orifices adjacent opposite sides of the other end of the arm, means normally maintaining the arm in a central position intermediate said ports whereby the pressure drop at each port will be equal when the arm is free of the pattern, and means including an enlargement of one of said orifices to create a pressure differential at said orifices and thereby in said channels sufficient to cause the flow dividing valve to take up a position which will cause movement of the pattern into engagement with the tracer.

8. In an hydraulically operated profiling machine having a control valve for changing the direction of relative movement between the work and cutter, the combination with an hydraulic amplification control system for determining the position of said valve including a pair of pressural control channels, the combination of a tracer control head, a pivoted arm supported in the head, means on one end of the arm for engaging the pattern, a valve member formed on the other end of the arm, a pair of plungers mounted in the head on opposite sides of said valve member, each plunger having an axial port formed therein, means coupling said channels to the respective ports, and means for axially adjusting said plungers to vary the amount of pressure drop at said ports for a predetermined position of the valve member, including threaded sleeves, means to clamp the sleeves in axially adjusted positions, and means for clamping the plungers to said sleeves and in an axial position as determined thereby.

9. A tracer control mechanism for an hydraulically operated milling machine having a primary valve for determining the direction of movement of work and pattern relative to cutter and tracer and an hydraulic amplification control system including a pair of pressural control channels, comprising a tracer head, axially opposed exhaust ports in the tracer head connected to the respective channels, a single movable arm for controlling the pressure drop at said ports and thereby through said channels the position of said valve, a diaphragm for supporting the arm in said head, and means on the lower end of said arm for contacting the pattern.

10. A tracer support for automatic profiling machines including a hollow tubular housing having a counterbore formed in one end, a tracer arm coaxial of said housing having means at one end for controlling a power circuit for determining the direction of movement of a work support relative to a cutter in accordance with a pattern, means at the other end of the arm for contacting a pattern, means for supporting the arm in said counterbore including a diaphragm fixed with the arm and having a peripheral flange fitting the counterbore, a first sleeve mounted in the counterbore for engaging and clamping the diaphragm, means for preventing rotation of said sleeve, and a second sleeve threaded in the counterbore to effect clamping of the first sleeve without twisting said diaphragm.

11. A tracer control mechanism for hydraulically operated profiling machines comprising a rotatable tracer head, a tracer button carried by said head for contacting a pattern, means to adjust the center of the button eccentric to the center of the head, a directional control valve coupled with the head for rotation therewith and operative to determine the angular direction of work and pattern movement, an hydraulic motor for rotating said head and valve, a source of fluid pressure, a flow dividing valve for distributing the flow between said directional control valve and said motor, an hydraulic amplification control system for determining the position of said flow dividing valve including a pair of opposed jets, a pivoted arm for supporting the tracer button and said head, said arm having valve means thereon interposed between said jets for varying the resistance of flow therefrom, and additional means driven by said hydraulic motor for effecting a depth feed movement of the work support in a direction parallel to the axis of said tracer and cutter.

12. A tracer control mechanism for hydraulically operated profiling machines comprising a rotatable tracer head, a tracer button carried by said head for contacting a pattern, means to adjust the center of the button eccentric to the center of the head, a directional control valve coupled with the head for rotation therewith and operative to determine the angular direction of work and pattern movement, an hydraulic motor for rotating said head and valve, a source of fluid pressure, a flow dividing valve for distributing the flow between said directional control valve and said motor, an hydraulic amplification control system for determining the position of said flow dividing valve including a pair of opposed jets, a pivoted arm for supporting the tracer button and said head, said arm having valve means thereon interposed between said jets for varying the hydraulic resistance of flow therefrom, additional means driven by said hydraulic motor for effecting a feed movement of the work support in a direction parallel to the axis of said tracer and cutter, and automatic means controlled by the arm upon engagement of the tracer button with the bottom of the die to automatically disconnect a depth feeding mechanism from said motor.

13. A tracer control mechanism for automatic die-sinking machines including a tracer head having an arm pivotally mounted therein, an hydraulic pilot control circuit for controlling movements between the tracer and pattern and thereby between the cutter and work in different directions in the same plane, power operated means for effecting a feeding movement at right angles to said plane, and an electrical control circuit responsive to axial movement of said arm for disconnecting said feeding means.

14. A tracer control mechanism for automatic pattern controlled milling machines including a tracer head, a tracer arm mounted for relative movement in said head, a valve member secured to the arm and responsive to lateral movement by a pattern for controlling a fluid operable feed circuit in the machine and a contact carried by said arm and responsive to a different movement of the tracer arm for controlling an electrically operated feed circuit in the machine.

15. In a die-sinking machine having an hydraulic power circuit for determining relative movement between a cutter and work and between a pattern and tracer in a given plane, and an electrical power circuit for determining relative movement between the parts in a second plane, the combination of a tracer mechanism for controlling both circuits including an arm having a valve member thereon for controlling the hydraulic circuit and a contact for controlling the electrical circuit.

16. In a die-sinking machine having an hydraulic power circuit for determining relative movement between a cutter and work and between a pattern and tracer in a given plane, and an electrical power circuit for determining relative movement between the parts in a second plane, the combination of a tracer mechanism for controlling both circuits including an arm having a valve member thereon for controlling the hydraulic circuit and a contact for controlling the electrical circuit, said arm being oscillatable for controlling one circuit and axially movable for controlling the other circuit.

17. In a die-sinking machine having an hydraulic control circuit for determining relative movement between a cutter and work in a given plane, a tracer controlled mechanism having a valve for controlling operation of said circuit, said machine having additional means including a control clutch, for effecting relative movement between the cutter and work in direction normal to said plane, electrically energizable means for shifting said clutch, and means in said tracer mechanism for automatically controlling operation of the clutch.

18. In a die-sinking machine having an hydraulic control circuit for determining relative movement between a cutter and work in one plane, the combination of a tracer controlled mechanism including a tracer arm having an integral valve member for controlling operation of said circuit, said machine having additional means including a control clutch for effecting relative movement between the parts in a direction normal to said plane, electrically energizable means for shifting said clutch, and means including a switch operable by the arm and a relay circuit for automatically controlling shifting of said clutch.

19. In a die-sinking machine having an hydraulic control circuit for determining relative movement between a cutter and work piece in one plane, and means including a three position control clutch for effecting relative movement in a direction normal to said plane, the combination of a tracer controlled mechanism including a tracer arm movable by a pattern and having an integral valve member for controlling operation of said circuit, electrically energizable means for shifting said clutch between two positions, means including a switch operable by the arm and a relay circuit for automatically controlling the shifting of said clutch, and a lost motion connection between the clutch and its operating means whereby the clutch may be manually moved to a third position.

BERNARD SASSEN.